(12) United States Patent
Iwata

(10) Patent No.: US 6,478,305 B1
(45) Date of Patent: Nov. 12, 2002

(54) SEALING STRUCTURE

(75) Inventor: Kazuyuki Iwata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 64 days.

(21) Appl. No.: 09/666,556

(22) Filed: Sep. 21, 2000

(30) Foreign Application Priority Data

Sep. 24, 1999 (JP) ............................... 11-271129

(51) Int. Cl.[7] ................................. F02F 11/00
(52) U.S. Cl. ................... 277/591; 277/591; 277/594; 277/598
(58) Field of Search ................... 277/591, 592, 277/594, 598

(56) References Cited

U.S. PATENT DOCUMENTS

| | | | | |
|---|---|---|---|---|
| 4,832,349 A | * | 5/1989 | Kawai et al. | 123/198 E |
| 5,275,420 A | * | 1/1994 | Rodenkirch | 277/313 |
| 5,727,791 A | * | 3/1998 | Weiss et al. | 277/592 |
| 5,868,109 A | * | 2/1999 | Kunzel et al. | 123/195 C |
| 6,056,296 A | * | 5/2000 | Ii | 277/592 |
| 6,349,944 B1 | * | 2/2002 | Sugiyama et al. | 277/591 |

FOREIGN PATENT DOCUMENTS

JP          11-230356          8/1999

* cited by examiner

*Primary Examiner*—Anthony Knight
*Assistant Examiner*—Enoch Peavey
(74) *Attorney, Agent, or Firm*—Armstrong, Westerman & Hattori, LLP

(57) ABSTRACT

Gasket mounting surfaces 1e, 2e of a cylinder block 1 and a cylinder head 2 which confront each other across a plate gasket G which is interposed therebetween are formed into flat surfaces, and a gap C is formed between these surfaces 1e, 2e which is adapted to surround the plate gasket G at a distal end and a side edge thereof and has a depth corresponding to the thickness of the gasket G, whereby a part of a liquid packing P for sealing mating surfaces of the cylinder block 1, the cylinder head 2 and a chain case 17 is designed to be filled in this gap C.

7 Claims, 6 Drawing Sheets

SEALING STRUCTURE

BACKGROUND OF THE INVENTION

1. Field of the Invention

The present invention relates to a sealing structure for sealing three-surface mating portions of a connecting portion. of a first member, a second member and a third member which is provided so as to extend over the first and second members by allowing a plate gasket to beheld between the first and second members and also allowing a liquid packing to be interposed not only between the first member and second member but also between the first and second members and the third member.

2. Description of the Related Art

The applicant of the present invention has already proposed a sealing structure for sealing three-surface mating portions of a connecting portion of three members by a combination of a plate gasket and a liquid packing (JP-A11-230356).

In the proposed sealing structure, a reservoir portion for a liquid packing having a depth greater than the thickness of a plate gasket and a relatively large capacity is formed between gasket mounting surfaces of a first member (a cylinder block) and a second member (a cylinder head) which are adapted to hold the plate gasket therebetween so that a part of a liquid packing for providing sealing between the first and second members and a third member (a chain case) is filled in this reservoir portion as well, whereby it is ensured that the aforesaid sealing is properly provided even if there exists an error in size the plate gasket.

It has been found, however, that the above proposed sealing structure causes the following drawbacks due to the presence of the reservoir portion for the liquid packing:

1. The setting speed of the liquid packing filled in the reservoir portion having the relatively large capacity is slower than that of the liquid packing filled. in the other portion, whereby a waiting time becomes longer before sealing properties inspection (pressure inspection) work is started, this deteriorating the working properties;
2. The amount of the liquid packing used becomes large; and
3. The reservoir portion for the liquid packing adversely affects the rigidity of the three-surface mating portions.

SUMMARY OF THE INVENTION

The present invention was made in view of the aforesaid situation, and an object thereof is to provide a novel sealing structure which can solve the problems.

With a view to attaining the above object, according to the aspect of the invention, there is provided a sealing structure wherein a plate gasket is held between gasket mounting surfaces of a first member and a second member and wherein a liquid packing is interposed between packing surfaces of the first and second members and a packing surface of a third member adapted to be provided on the first and second members so as to extend thereover, whereby three-surface mating portions at a connecting portion of the first, second and third. members are sealed with the plate gasket and the liquid packing, the sealing structure being characterized. In that at the three-surface mating portion, the gasket mounting surfaces of the first and second members which confront each other across the plate gasket are both formed flat and also both formed in such a manner that the gasket mounting surfaces extend longer. than an end edge of the plate gasket toward the packing surface of the third member and expand wider than the plate gasket inwardly thereof, and that a gap having a depth equal to the thickness of the plate gasket is formed between the gasket mounting surfaces of the first and second members in such a manner that the gap extends around from the end edge side of the plate gasket to an inner edge side thereof, whereby a part of the liquid packing for providing sealing between the packing surfaces of the first and second members and the packing surface of the third member is filled in the gap.

According to the construction, the three-surface mating portions at the connecting portion of the first, second and third members can securely be sealed with the plate gasket and liquid packing, and in particular since the packing filled between the gasket mounting surfaces of the first and second members which confront each other across the plate gasket can only be filled up to the depth which is equal to the thickness of the plate gasket, the setting speed of the liquid packing so filled can be increased, as a result of which the waiting time before the inspection of the sealing properties of the liquid packing can be reduced, whereby the working properties of the inspection work can greatly improved. On top of this, the amount of liquid packing used can be reduced. Moreover, there is no need to form a recessed portion in the gasket mounting surfaces of the first and second members, respectively for storing therein liquid packing. Furthermore, being attributable to increase in area of the mating surfaces of the connecting portion of the three members, the connecting portion of the three members is formed thick, and this increases the rigidity of the connecting portion and reduces the flexure of the mating surfaces of the connecting portion, thereby making it possible to attempt at improving further the sealing properties of the connecting portion. In addition, since the thickness of the liquid packing at the three-surface mating portions of the connecting portion of the first, second and third members can be made to coincide with the thickness of the plate gasket, there is no likelihood that the sealing function of a product such as an internal combustion engine scatters product by product.

BRIEF DESCRIPTION OF THE DRAWINGS

In FIG. 1;

DETAILED DESCRIPTION OF THE PREFERRED EMBODIMENTS

A mode for carrying out the invention will be described below based on embodiments shown in the accompanying drawings.

The present embodiment is an embodiment in which the present invention is applied to mating surfaces of three members such as a cylinder block, a cylinder head and a chain case of a four-cycle four cylinder internal combustion engine.

First, a first embodiment of the present invention will be described referring to FIGS. 1 to 6.

In a description below, a direction intersecting orthogonally with a crankshaft of an internal combustion engine is referred to as a "longitudinal direction," a direction of the crankshaft of the internal combustion engine is referred to as a "lateral direction," a cylinder head side of the internal combustion engine is referred to as an "upward direction," and a crankshaft side of the internal combustion engine is referred to as a "downward direction."

Figure 1:
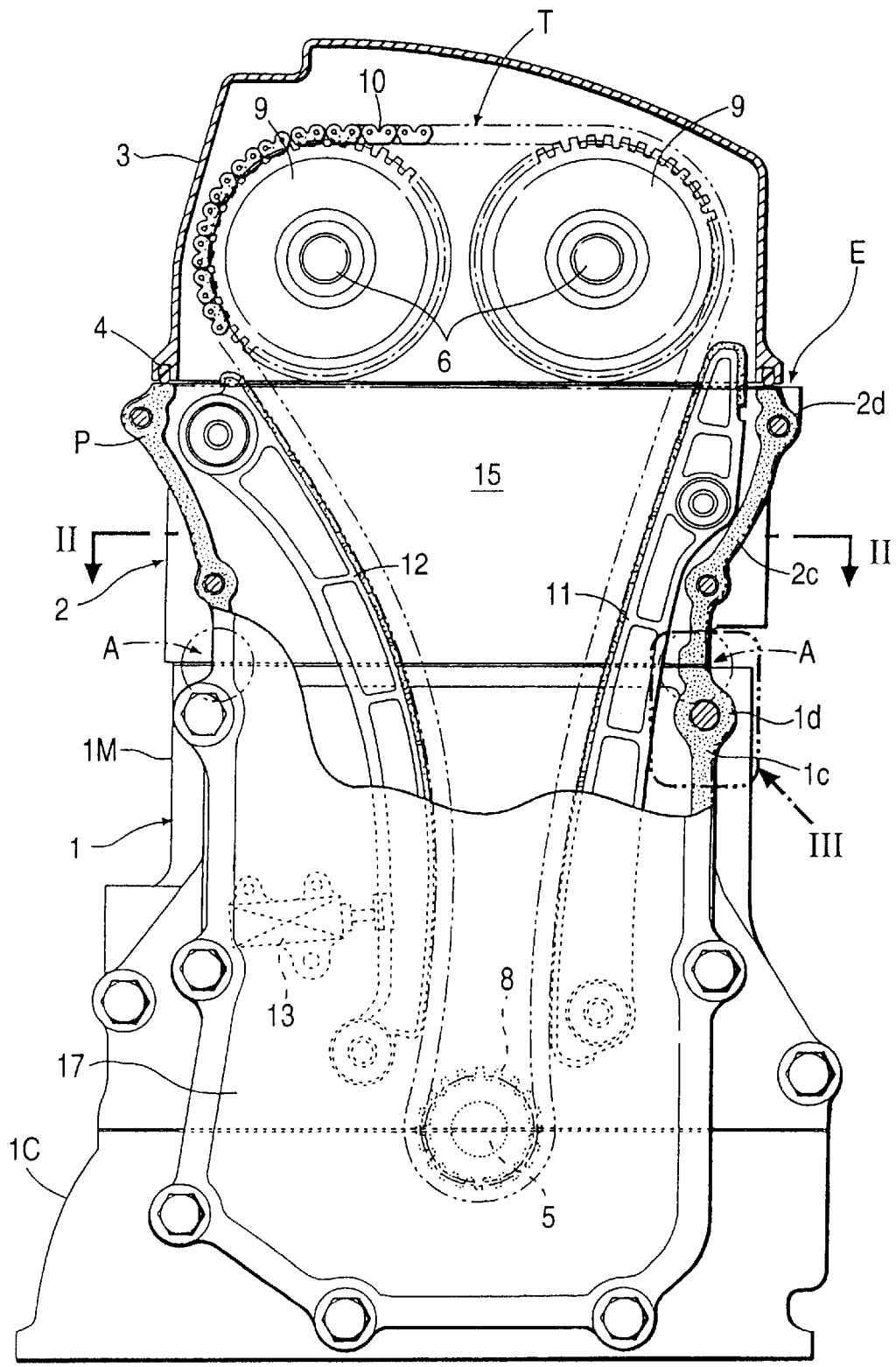
FIG. 1 is a partially cutaway end face of an internal combustion engine in which a sealing structure according to the invention is implemented (a first embodiment)

In FIG. 1, an engine main body E of a four cycle internal combustion engine comprises a cylinder block 1 and a cylinder head 2 integrally bonded to an upper surface of the cylinder block 1 via a plate gasket G. The cylinder block 1 is constituted by a main body portion 1M having cylinders and a crankcase portion 1C adapted to be integrally connected to a lower surface of the main body portion 1M. In addition, a head cover 3 is secured to an upper surface of the cylinder head 2 via a packing 4. As usual, a crankshaft 5 is rotatably supported at a lower portion in the cylinder block 1 and a pair of valve train camshafts 6 are rotatably supported above the cylinder head 2.

The crankshaft 5 and the pair of valve train camshafts 6 are interlocked with each other via a timing transmission mechanism T, and this timing transmission mechanism T is constituted by a driving sprocket 8 secured to the crankshaft 5, driven sprockets 9 secured to the valve train camshafts 6, respectively and an endless timing chain 10 extended over both the sprockets 8, 9, wherein the rotation of the crankshaft 5 is designed to be transmitted to the valve train camshafts 6 in such a manner that the camshafts rotate at half of crankshaft speed. A guide member 11 is provided on a tension side of the timing chain 10 for guiding the tension side of the timing chain, while a tensioner 12 with a lash adjuster 13 is provided on a slack side of the timing chain for adjusting the tension of the timing chain.

The timing transmission mechanism T is accommodated in a timing transmission chamber 15 formed at one end of the crankshaft 5 in the engine main body E. This timing transmission chamber 15 is formed into a U-shaped configuration in cross-section by an end wall 1a of the cylinder block 1 and an end wall 2a of the cylinder head 2, and longitudinal projecting walls 1b, 2b of the cylinder block and the cylinder head which extend integrally outwardly from longitudinal end edges (left and right end edges as viewed in FIG. 1) of both the end walls 1a, 2a. End faces of these projecting walls 1b, 2b are formed into mating surfaces (packing surfaces) 1c, 2c which are flush with each other and flat, and a mating surface (a packing surface) 17c of a chain case 17 is fluid-tightly bonded to both the mating surfaces 1c, 2c via a liquid packing P, which will be described later, for closing an open side of the timing transmission chamber 15. Additionally, as clearly shown in FIG. 1, a plurality of boss-like expanded portions 1d, 2d are formed on the end faces of the projecting walls 1b, 2b of the cylinder block and the cylinder head in a vertical direction at certain intervals, and blind internal thread holes 18 are opened in these expanded portions 1d, 2d for use in bolting the chain case 17 to the cylinder block 1 and the cylinder head 2

The lower surface (the gasket mounting surface) 2e of the cylinder head 2 is overlaid on the upper surface (the gasket mounting surface) 1e of the cylinder block 1 via the plate gasket G which is interposed therebetween, and the cylinder block 1 and the cylinder head 2 are, as normally, connected together with connecting means such as connecting bolts.

Figure 2:
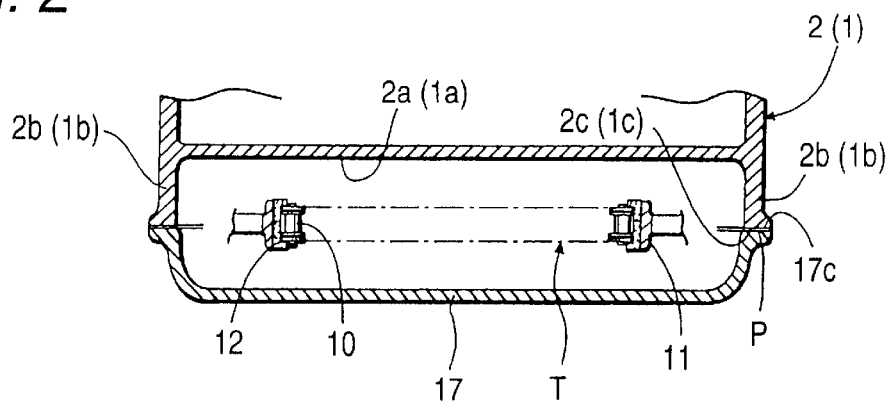
FIG. 2 is a cross-sectional view taken along the line II—II of FIG. 1.
Figure 3:
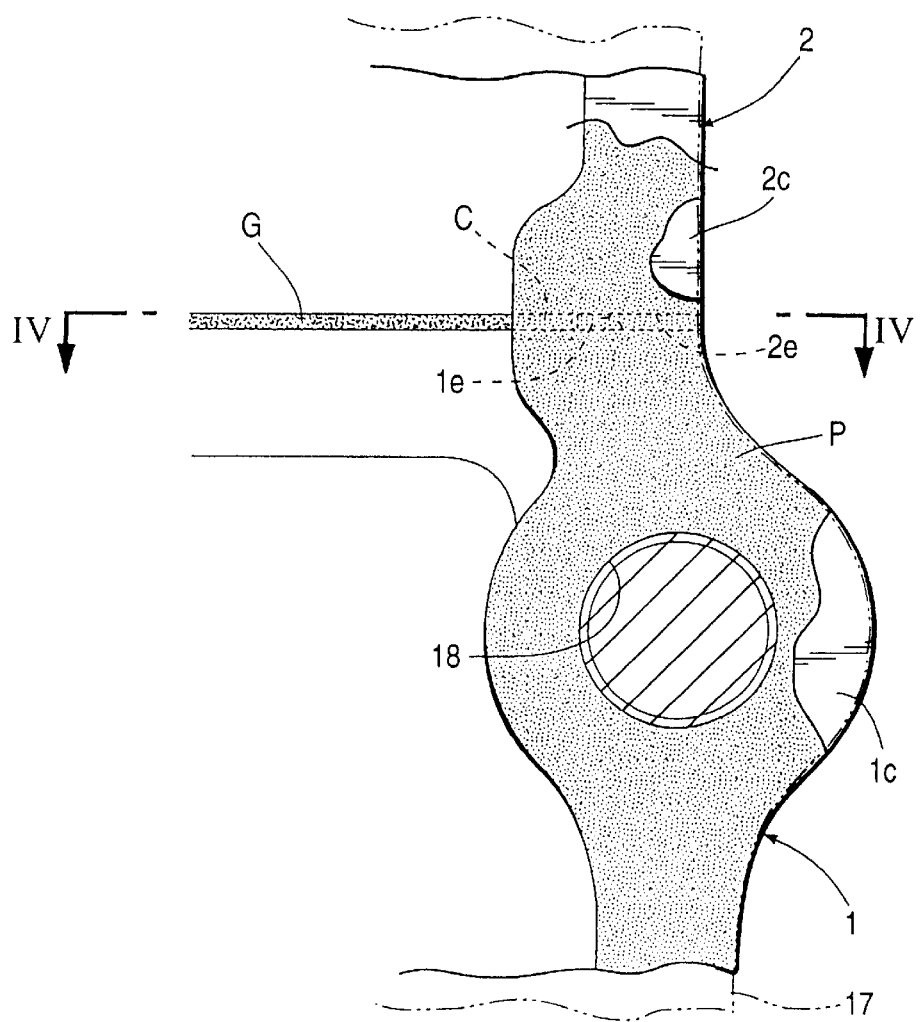
FIG. 3 is an enlarged view of a portion surrounded by an imaginary line which is indicated by an arrow III.

A connecting construction at a connecting portion of the three members such as the cylinder block 1, the cylinder head 2 and the chain case 17 and a sealing construction at mating surfaces of the connecting portion of the aforesaid three members are implemented on both longitudinal sides of the engine main body E across the crankshaft 5, as shown at A of FIG. 1, and since the connecting and sealing constructions are identical on the longitudinal sides of the engine main body E, only one of them will be described below, with reference to FIGS. 1, 2, as well as FIGS. 3 to 6.

Figure 5:
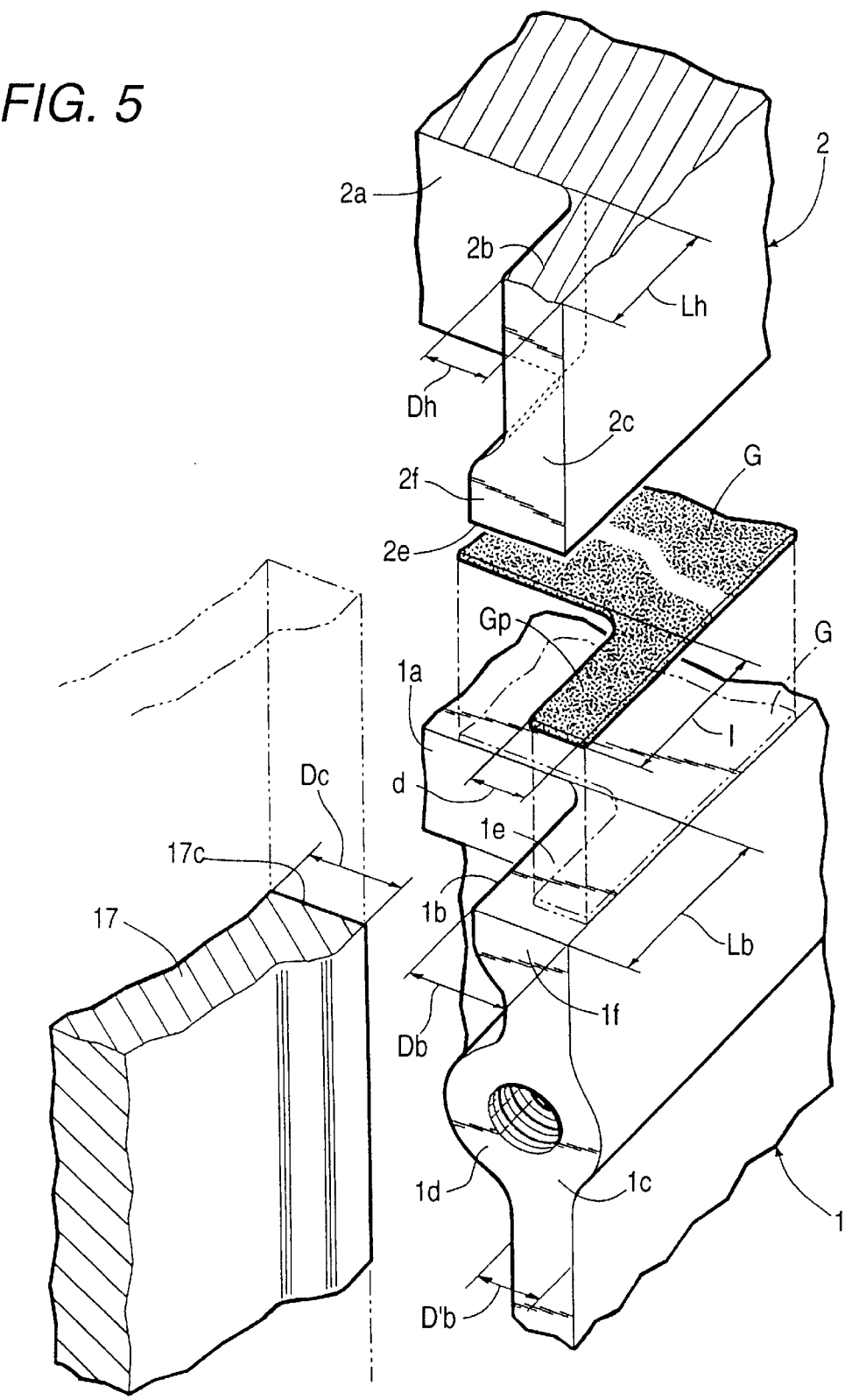
FIG. 5 is an exploded view of a connecting portion of the cylinder block, the cylinder head and a chain case.

First, as is clearly shown in FIG. 5, the connecting portion A of the cylinder block 1 relative to the cylinder head 2 and the chain case 17 has the projecting wall 1b for forming the timing transmission chamber 15 at a corner portion of the upper surface and is formed into an L-shaped configuration in cross-section. The connecting portion A is characterized in that the mating surface or the gasket mounting surface of the upper surface 1e with the cylinder head 2 is formed flat over the full area thereof (1), and that the length Lb and width Db of the upper surface of the projecting wall 1b are made longer and wider than the actual length 1 and width d of a projecting portion Gp of the plate gasket G, which will be described later, corresponding to the upper surface of the projecting portion In the cylinder block 1, in order to secure the length Lb and the width Db of the upper surface (the gasket mounting surface) of the projecting wall 1b, the projecting portion 1b is formed longer than the projecting portion Gp of the gasket G and is formed thicker inwardly (toward the timing transmission chamber 15 side) at an upper portion thereof so as to integrally form an expanded portion 1f, whereby the width Db of the upper end portion including the upper surface of the projecting wall 1b is made wider than the width D'b of the remaining portion Additionally, in order to correspond to the upper surface configuration of the cylinder block 1, the plate gasket G at the connecting portion A has the strip-like projecting portion Gp and is thus formed into an L-shape, and as shown by chain lines in FIG. 5 when the plate gasket G is overlaid on the upper surface (the gasket mounting surface) 1e of the cylinder block 1, a step is formed between the projecting portion Gp of the plate gasket G and the upper surface 1e of the cylinder block 1 so as to form a hook-like gap C when viewed from top.

On the other hand, in the cylinder head 2, the connecting portion A-has the projecting wall 2b on the lower surface at a corner portion thereof in such a manner as to correspond to the projecting wall 1b on the cylinder block 1 and is formed into an L-shaped configuration in cross-section. The lower surface (the gasket mounting surface) 2e of the cylinder head 2 is formed similarly to the upper surface (the gasket mounting surface) 1e of the cylinder block 1 , and when the lower surface 2e of the cylinder head 2 is overlaid on the upper surface 1e of the cylinder block 1 (the gasket mounting surface) across the plate gasket G held therebetween, they coincide with each other. It is natural that the projecting wall 2e of the cylinder head 2 is made thicker integrally inwardly (toward the timing transmission chamber 15) so as to form an expanded portion 2f, and the length Lh and width Dh the lower surface of the projecting wall 2e of are equal to the length Lb and the width Db the upper surface 1e the projecting portion 1b the cylinder block.

In a state in which the cylinder block 1 and the cylinder head 2 are integrally mated and connected together across the plate gasket G interposed therebetween, the end faces 1c, 2c of the projecting walls 1b, 2e of the cylinder block and the cylinder head are flush with each other so as to form mating surfaces (packing surfaces) to the chain case 17.

Next, as shown in FIG. 2, the chain case 17, which is allowed to extend over the cylinder block 1 and the cylinder head 2 so as to be connected to the block and the head via a liquid packing P which is to be interposed therebetween, is formed into a U-shaped configuration in cross-section, and a mating surface (a packing surface) 17c is formed on external end surfaces of side walls the chain case 17. The mating surface (the packing surface) 17c corresponding to the connecting portion of the cylinder head 1 and the cylinder block 2 are formed such that the width Dc the mating surface is wider than that of the remaining portions thereof, and this width Dc is constructed so as to coincide with the widths Db, Dh.

Then, in attempting at assembling an internal combustion engine, the lower surface (the gasket mounting surface) 2e of the cylinder head 2 is mated to the upper surface (the gasket surface) 1e the cylinder block 1 across the plate gasket G which is interposed therebetween, the gap C having a depth equal to the thickness the plate gasket G is formed in front the projecting portion Gp the plate gasket G in the longitudinal direction and inwardly thereof in the lateral direction, and this gap C is made open in front (toward the chain case 17) and on an internal (toward the timing transmission chamber 15) side the projecting walls 1b, 2b of the cylinder block 1 and the cylinder head 2.

Figure 6A:
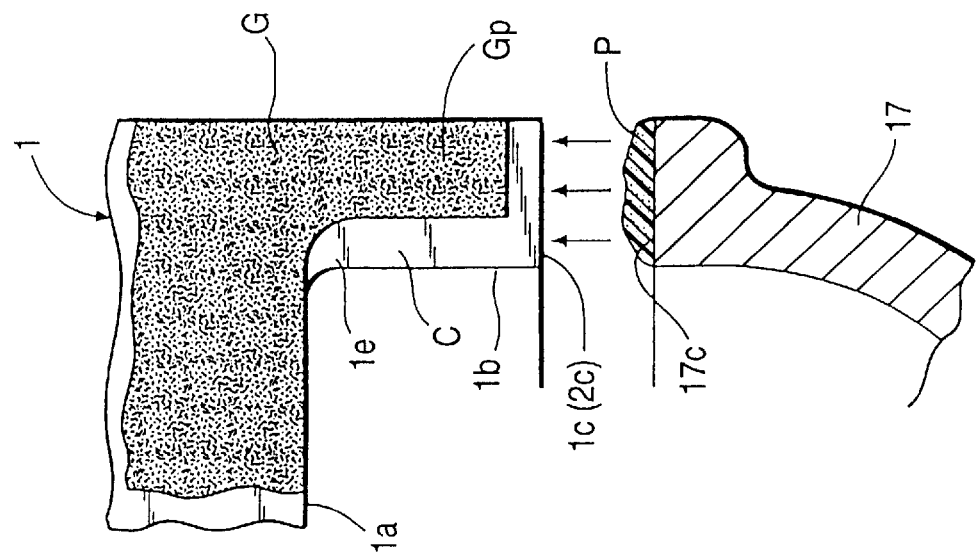
FIGS. 6A and 6B are diagrams showing the operation of a sealing process of a liquid packing.
Figure 6B:
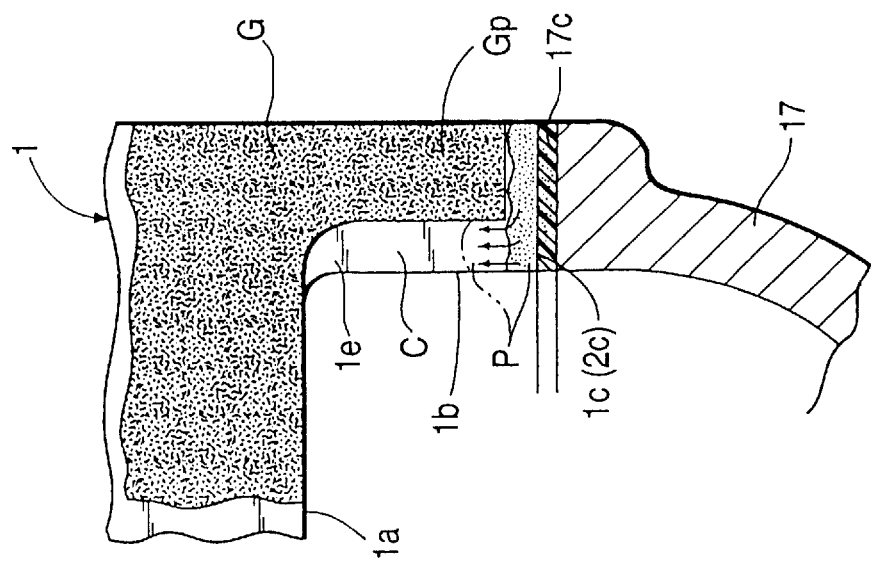

Next, as shown in FIG. 6A, a suitable amount of gel-like liquid packing P comprising a silicone rubber is applied to the connecting surface (the packing surface) 17c the chain case 17, then the connecting surface 17c is, as shown in FIG. 6B, overlaid onto the mating surfaces (the packing surfaces) 1c, 2c the cylinder block 1 and the cylinder head 2, and finally, the mating surfaces are bonded together. When this occurs, the liquid packing P is interposed between those mating surfaces (the packing surface), and residual packing is allowed to bypass into the hook-like gap C for accumulation therein as well.

Figure 4:
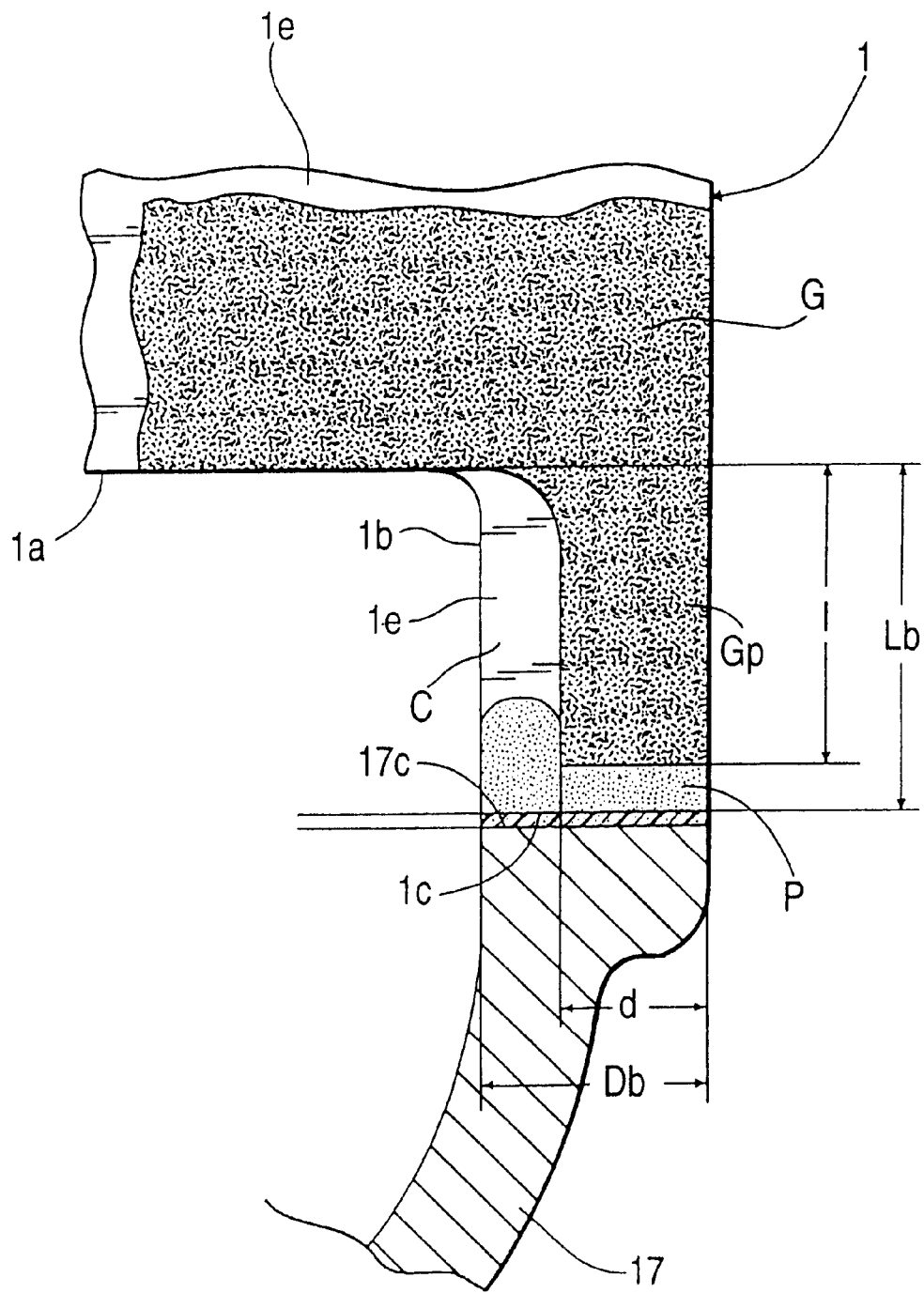
FIG. 4 is a cross-sectional view taken along the line IV—IV of FIG. 3.

With passage a predetermined period of time, in the event that the liquid packing is set, the chain case 17 is integrally bonded to the cylinder block 1 and the cylinder head 2 via that liquid packing P, and the liquid packing P which flows into the gap C is also set, and the liquid packing P flows from the end edge of the plate gasket G along the side thereof, whereby as shown in FIG. 4, the gap between the end edge of the gasket G and the mating surface 17c the chain case 17 is filled therewith. In particular, a part the of liquid packing P sets into a mass along the side the plate gasket G so as to face the timing transmission chamber 15 side, this ensuring further that the timing transmission chamber 15 is sealed externally and internally thereof.

Moreover, while the liquid packing P continues to flow, the vertical width the gap C corresponds to the thickness of the plate gasket G such that the volume the liquid packing P so flowing is maintained small and the liquid packing P flows in a plate-like fashion, and since there exists no mass portion, there is no risk the liquid packing P being present in this gap C being delayed in setting when compared with the setting of the liquid packing P present in the other portions, whereby the setting speed of the liquid packing P is increased as a whole, as a result of which a time involved in seal inspection (pressure inspection) the liquid packing P can be reduced. Additionally, only a smaller amount of liquid packing P has to be used when compared with the sealing structure the applicant proposed before.

In addition, at the connecting portion A the three members, a recessed portion for reserving therein liquid packing P does not have to be formed in the gasket mounting surfaces 1e, 2e the projecting walls 1b, 2e of the cylinder block 1 and the cylinder head 2, and additionally, the expanded portions 1f, 2f are formed on the projecting walls 1b, 2e, of thereby making it possible to enhance the strength of the connecting portion A.

Next, referring to FIG. 7, a second embodiment according to the invention will be described below.

Figure 7:
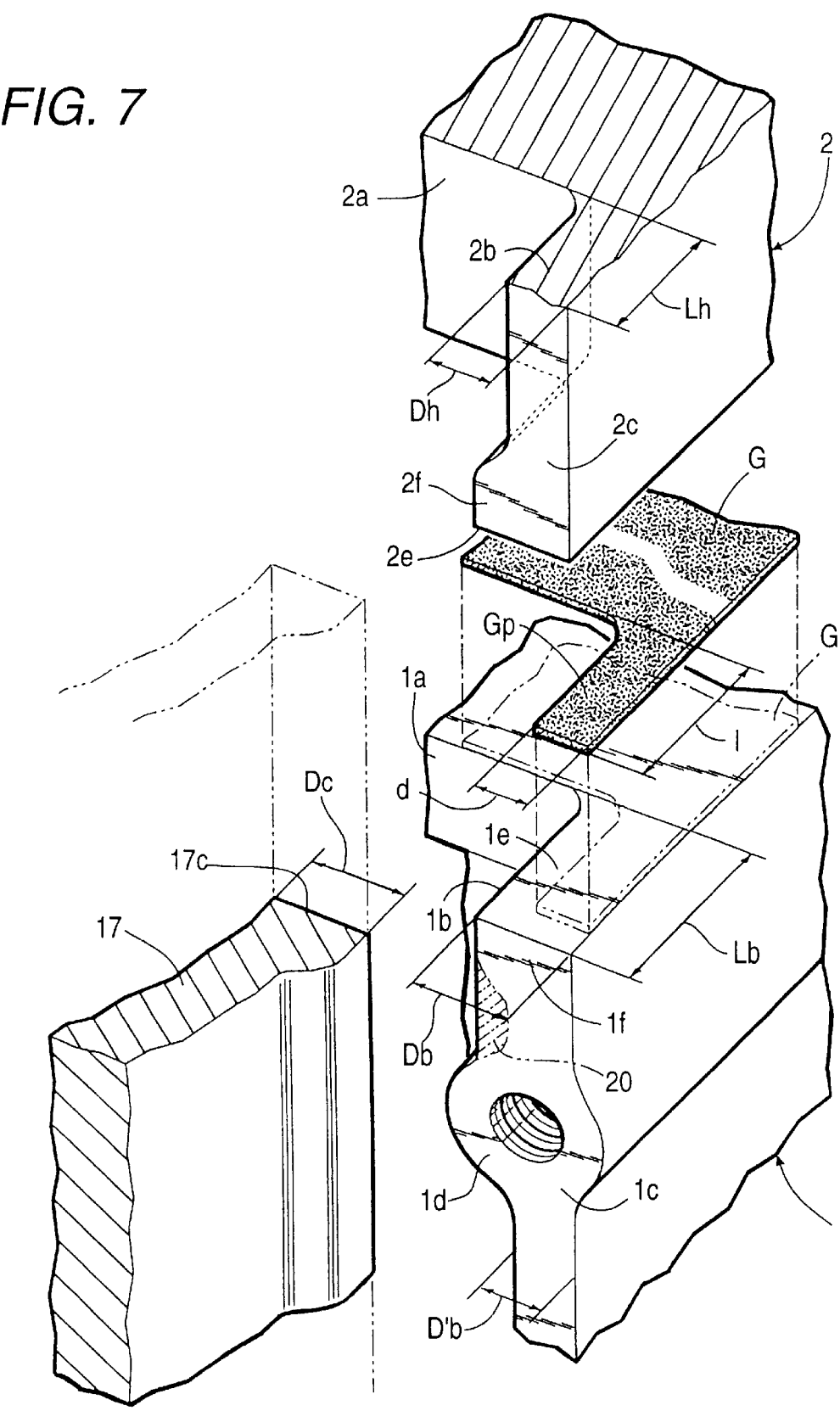
FIG. 7 is an exploded perspective view of a coupling portion of a cylinder block, a cylinder head and a chain case (a second embodiment).

FIG. 7 shows an exploded perspective view of a coupling portion of a cylinder block, a cylinder head and a chain case according to the second embodiment of the invention. In the figure, like reference numerals are given to elements like to those the first embodiment.

This second embodiment is different from the first embodiment in that a reinforcement wall 20 is provided so as to reinforce a portion between an uppermost expanded portion 1d formed on a projecting wall 1b the cylinder block 1 for fastening the chain case 17 and an extended portion 1f formed at an upper portion the projecting wall 1b.

Then, with this second embodiment, it is possible not only to provide the same effectiveness as that provided by the first embodiment but also to enhance further the fastening rigidity the chain case 17. Thus, while the embodiments of the invention have been described heretofore, the invention is not limited to those embodiments, but it may be modified in various ways within the scope the invention. For instance, in the above embodiments, the sealing structures have been described as being applied to the connecting portion of the cylinder block, the cylinder head and the chain case the internal combustion engine, but the sealing structure may of course be implemented at a connecting portion for any three members, and moreover, the liquid packing may be applied to both packing surfaces of members that are to be joined to each other.

As has been described heretofore, according to the aspect the invention, the three-surface mating portions at the connecting portion the first, second and third members can securely be sealed with the plate gasket and liquid packing, and in particular since the packing filled between the gasket mounting surfaces the first and second members which confront each other across the plate gasket can only be filled up to the depth which is equal to the thickness the plate gasket, the setting speed the liquid packing so filled can be increased, as a result of which the waiting time before the inspection of the sealing properties the liquid packing can be reduced, whereby the working properties of the inspection work can greatly improved. On top this, the amount of liquid packing used can be reduced. Moreover, there is no need to form a recessed portion in the gasket mounting surfaces of the first and second members, respectively for storing therein liquid packing. Furthermore, being attributable to increase in area of the mating surfaces the connecting portion of the three members, the connecting portion of the three members is formed thick, and this can increase the rigidity of the connecting portion and reduce the flexure of the mating surfaces of the connecting portion, thereby making it possible to attempt at improving further the sealing properties the connecting portion In addition, since the thickness of the liquid packing at the three-surface mating portions of the connecting portion of the first, second and third members can be made to coincide with the thickness the plate gasket, there is no likelihood that the sealing function of a product such as an internal combustion engine scatters product by product.

While only certain embodiments of the invention have been specifically described herein, it will apparent that numerous modifications may be made thereto without departing from the spirit and scope the invention.

What is claimed is:

1. A sealing structure comprising:

a first member having a substantially flat first gasket mounting surface and a first end face intersecting said first gasket mounting surface, a second member having a substantially flat second gasket mounting surface and a second end face intersecting said second gasket mounting surface, said first and second gasket mounting surfaces being substantially coextensive and adapted to be disposed in opposed relation with respect to each other to place said first and second end faces in end-to-end relation, a plate gasket disposed between said first and second gasket mounting surfaces and being provided with a length and a width less than the length and width of said first and second gasket mounting surfaces and a thickness which cooperates to define a packing space having a first portion adjacent the end faces of said first and second members and a second portion communicating with said first portion and extending adjacent said plate gasket longitudinally of said gasket mounting surfaces, and a third member having a packing surface extending over the end faces of said first and second members, said packing surface being operative to carry a liquid packing for disposition between said packing surface on said third member and the end faces of said first and second members and for sealing the first and second portions of said packing space when said first member, said second member carrying said plate gasket and said third member are interconnected.

2. The sealing structure as set forth in claim 1, wherein said first member includes an extended portion such that the width of the first gasket mounting surface is increased.

3. The sealing structure as set forth in claim 2, wherein a reinforcement portion is formed for connecting a fastening portion on said first member to said extended portion.

4. The sealing structure as set forth in claim 1, wherein said second member includes an extended portion such that the width the second gasket mounting surface is increased.

5. The sealing structure as set forth in claim 4, wherein a reinforcement portion is formed for connecting a fastening portion on said second member to said extended portion.

6. The sealing structure as set forth in claim 1, wherein said plate gasket includes a projecting portion defining the width, the length and having the thickness the plate gasket.

7. The sealing structure as set forth in claim 1, wherein said plate gasket is arranged between said first and second gasket mounting surfaces such that a clearance is formed inside between said first and second gasket mounding surfaces.

* * * * *